Aug. 20, 1968     T. VAN'T HOFF     3,397,867

CUPS, MUGS OR SIMILAR LIQUID CONTAINER

Filed Dec. 21, 1966

INVENTOR
TEUNIS VAN'T HOFF

BY *Minnie & Smiley*

ATTORNEYS

United States Patent Office 3,397,867
Patented Aug. 20, 1968

3,397,867
CUPS, MUGS OR SIMILAR LIQUID CONTAINERS
Teunis van 't Hoff, Rotterdam, Netherlands, assignor to Impromex A.G., Freibourg, Switzerland, a company of Switzerland
Filed Dec. 21, 1966, Ser. No. 603,669
Claims priority, application Netherlands, Dec. 24, 1965, 6516926
7 Claims. (Cl. 259—1)

ABSTRACT OF THE DISCLOSURE

Internal projections of a saw tooth configuration placed near the bottom of a cup, mug or similar vessel to facilitate and promote the mixing of material placed in the cup as liquid is added.

---

Figure 1:
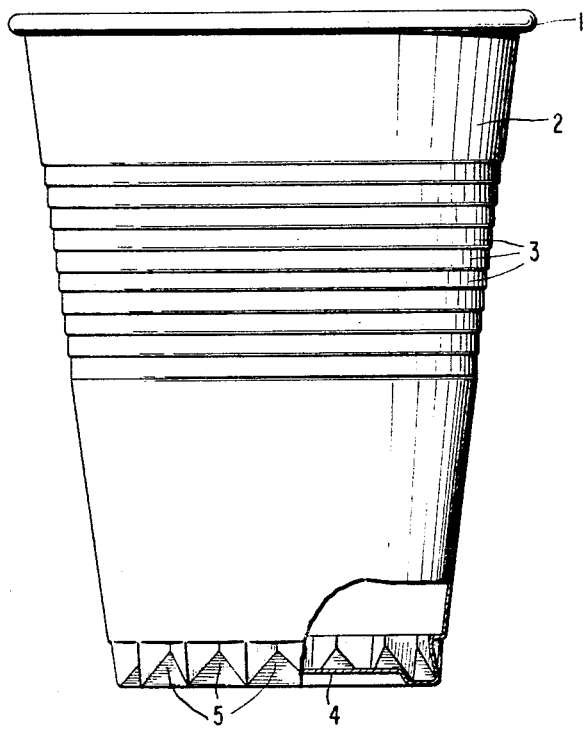

The invention relates to a cup, mug or similar liquid container, more especially made of plastic, comprising an open top, a closed bottom, a wall part extending between said top and said bottom, a circular series of projections, teeth or cams protruding from said cup wall into the cup cavity and located near said cup bottom.

Such a cup made of paper is known from the U.S. patent specification 2,088,181, and, nowadays, is also produced from plastic sheet material by means of a vacuum forming method for use as a nestable cup in an automatic beverage dispenser. In such case the beverage is normally fed to the interior of the cup in a continuous stream or jet of a not yet completely homogeneous mixture of liquid, e.g., water, and of solid constituents to be dissolved or to be dispersed in the liquid, e.g., coffee powder, milk powder and sugar. If the mixture feeding jet is directed obliquely against the upstanding cup wall, generally a whirling or vortex movement of the supplied mixture amount is created, whereby a further mixing effect of the supplied constituents takes place. Nevertheless, practice has shown that this mixing is incomplete, which adversely affects the taste of the beverage.

The invention provides a solution for this problem. The fast is that it has been found that a considerable amelioration of the mixing effect of the supplied constituents and of the taste of the beverage mixture resulting thereof is obtained if, as proposed by the invention, the projections, teeth or cams of a cup, mug or similar liquid container of the type according to the opening lines have inwardly bevelled horizontal cross sections and, along at least part of the circular series, substantially join each other laterally. The achieved effect is found to improve if the projections, teeth or cams have, apart of horizontal, also vertical inwardly bevelled cross sections.

In a cup, mug or similar liquid container which does not satisfy the inventive specification mentioned herebefore, e.g. a plastic cup having projections, teeth or cams which protrude into the cup cavity but are tangentially (of the cup) spaced apart over considerable distances or which protrude from the cup outwardly or a mug having a smooth inner wall, according to the invention, the desired effect of ameliorated mixing may be obtained through application of a separate insert member, e.g. of plastic, which may be arranged on the bottom or the wall of the relevant cup or mug and comprises a conical flange providing a circular series of inwardly protruding projections, teeth or cams, e.g. formed by indentation of a plastic ring, which likewise have inwardly bevelled horizontal and eventually also vertical cross sections and furthermore substantially join each other laterally. With the aid of such an insert member which, f.i., may be mounted by means of clamping, gluing or welding against the upstanding wall of an interiorly smooth drinking mug or cup near the bottom thereof, also with such drinking gear a better mixing of the supplied constituents and a better taste effect are found to be obtained.

The invention will be elucidated in the now following description with reference to the accompanying drawing of some embodiments, to which, however, the invention is definitely not restricted.

Figure 2:
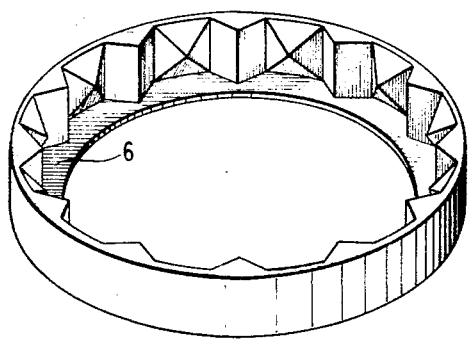

In the drawing:

FIG. 1 shows a plane view of a plastic cup, the wall of which has partially been omitted for the sake of clarity, and FIG. 2 shows a perspective view of an insert member intended to be secured in a cup or mug.

The cup represented in FIG. 1 extends from a beaded upper edge 1 as a substantially conical wall 2, in which a number of coaxial, circular ribs 3 are provided just above its medium height, towards a cup bottom 4 closing the wall 2 at its lower end.

Near the inwardly recessed bottom 4, the cup wall 2 is provided with a number of projections 5 which protrude towards the interior of the cup and have been obtained by indentation of the cup wall 2, as may be seen clearly at the lower right side of FIG. 1. The projections 5 protrude from their respective bases in the cup wall 2 as pyramid shaped bodies into the cup cavity, the different "upstanding" walls of each pyramid-shaped projections forming plane or curbed triangles or quadrangles. The projections join each other laterally and, in this case, have in their horizontal as well as in their vertical cross sections bevelled profiles as a consequence of their pyramid-shape.

Consequently, a stream or jet of liquid and solid constituents to be mixed, when supplied in an oblique direction against the cup wall, will pass through a continuous sequence of small, discontinuous changes of direction during its vortex movement along the ring of projections 5, whereby a number of additional whirls is originated in the main whirl or vortex and an ameliorated mixing effect is achieved.

In the case of the cup represented in FIG. 1 it has been assumed that the cup has been manufactured in a vacuum forming process, according to which the projections 5 are preferably formed as indentations having about the same wall thickness as the cup wall 2 and bottom 4. If the cup is manufactured according to another process, it may be preferred to form the projections 5 as massive teeth or cams.

The insert member shown in FIG. 2 has a closed flange providing a circular series of projections joining each other laterally along the flange and having a pyramid shaped or a sloped roof shaped profile, respectively. It is also possible, of course, to use an insert member having only pyramid-shaped or, in their horizontal cross sections, only triangle-shaped projections, respectively. In the embodiment shown the projections are formed as massive teeth. In order to strengthen the insert member, furthermore, a horizontal flange or circular bottom 6 may be provided which rests on the bottom of the cup or mug to be equipped with the insert member. In a cup or mug having initially no ring of inwardly protruding, substantially joining projections, the application of the insert member leads likewise to the amelioration of the mixing of the supplied constituents, which has been described with reference to FIG. 1.

What is claimed is:
1. A cup, mug or similar vessel which facilitates and insures mixing of matter placed into the same comprising, in combination,
   a container having a side wall presenting an open top and a closure at its lower end,
   and means adjacent to the lower end of said container to facilitate and insure complete mixing of matter placed in the container as liquid is poured thereinto, said means being composed of inwardly directed projections arranged in saw tooth fashion to extend at least partially around the inner surface of said side wall, each of said projections having an upper surface of substantially triangular shape in plan view and opposite side walls, the corresponding side walls of adjacent projections intersecting each other, and at least some of said projections having substantially flat inclined downwardly facing bottom surfaces, which form pockets beneath such projections whereby when a liquid is directed into said container obliquely against said side wall, a vortex will be formed and said projections will form additional vortexes which tends to more completely mix said matter.

2. A cup, mug or similar vessel according to claim 1, in which all of said upper surfaces are coplanar and parallel to said closure, each of said projections having a downwardly facing bottom surface.

3. A cup, mug, or similar vessel according to claim 1, in which alternate projections are of pyramid shape.

4. A cup, mug, or similar vessel according to claim 3, in which said means is a separate insert.

5. A cup, mug, or similar vessel according to claim 1, in which said means is a separate insert.

6. A cup, mug, or similar vessel according to claim 1, in which said projections are formed integral with said side wall.

7. An insert for a cup, mug, or similar vessel which facilitates and insures mixing of matter placed into such vessel comprising, a body having a horizontal bottom wall adapted to fit into a vessel with which it is associated and position the body therein, said body also having an upstanding flange projecting upwardly from the margin of said bottom wall, and a series of projections integral with said flange, said projections being arranged in saw tooth fashion and extending around the inner surface of said flange, each projection having an upper surface of substantially triangular shape in plan view and opposite side walls, the corresponding side walls of adjacent projections intersecting each other, and at least some of said projections having substantially flat inclined downwardly facing bottom surfaces, which form pockets beneath such projections whereby when a liquid is directed into a vessel containing said insert against the side wall of the vessel, a vortex will be formed and said projections will form additional vortexes which tend to mix matter placed into the vessel.

References Cited

UNITED STATES PATENTS

| | | | |
|---|---|---|---|
| 2,965,274 | 12/1960 | Brillis et al. | 229—1.5 |
| 3,083,888 | 4/1963 | Miller | 229—1.5 |
| 3,091,360 | 5/1963 | Edwards | 220—97 |
| 3,138,371 | 6/1964 | Feher et al. | |
| 3,285,456 | 11/1966 | Pewitt | 229—1.5 |

DAVIS T. MOORHEAD, *Primary Examiner.*